Oct. 5, 1965   A. C. KNIGHT   3,210,430
PREPARATION OF TETRAFLUOROETHYLENE
Filed May 24, 1963
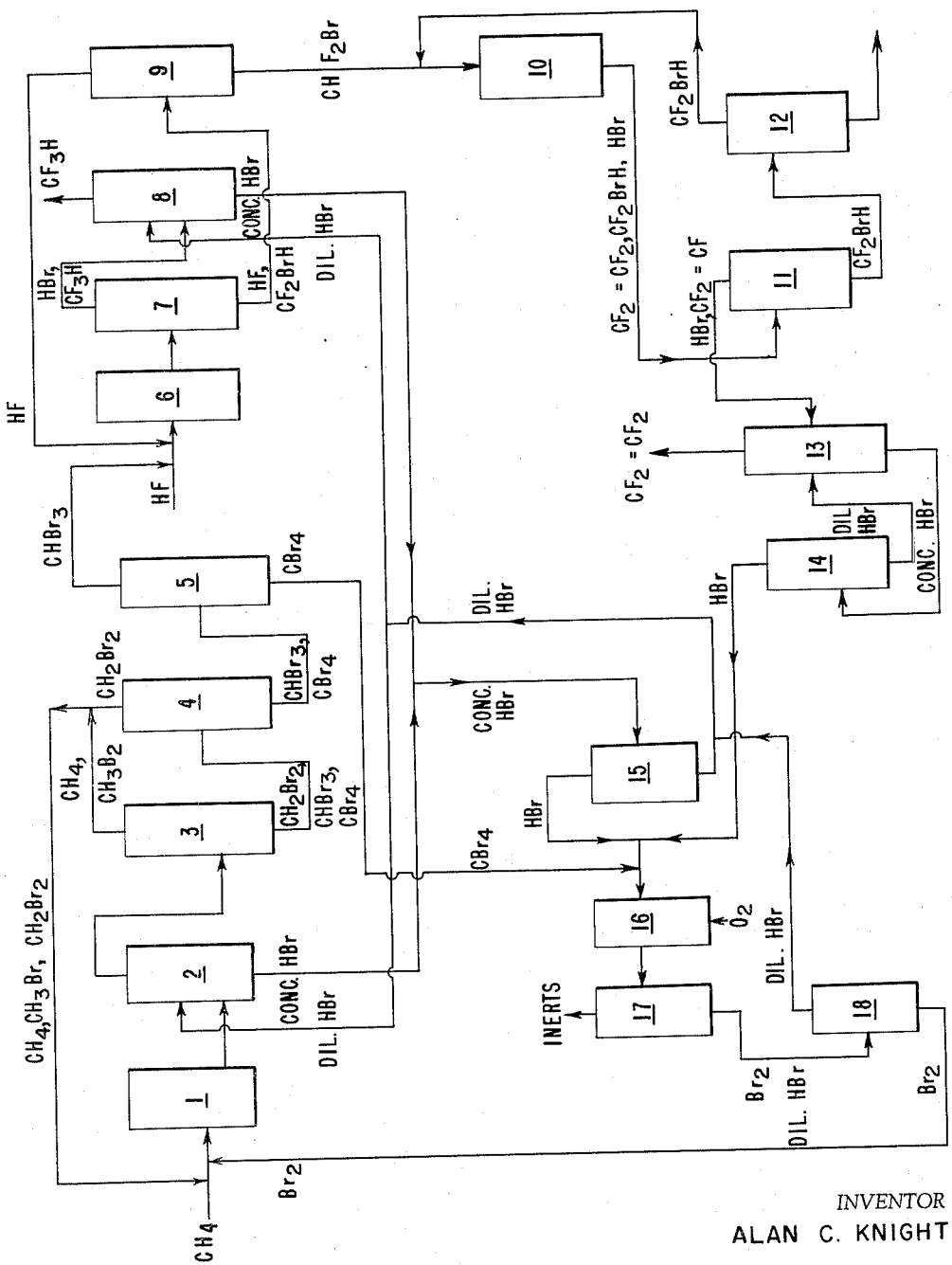
INVENTOR
ALAN C. KNIGHT
BY
ATTORNEY

# United States Patent Office 3,210,430
Patented Oct. 5, 1965

3,210,430
PREPARATION OF TETRAFLUOROETHYLENE
Alan Campbell Knight, Wilmington, Del., assignor to E. I. du Pont de Nemours and Company, Wilmington, Del., a corporation of Delaware
Filed May 24, 1963, Ser. No. 285,188
3 Claims. (Cl. 260—653.3)

This application is a continuation in part of S.N. 137,685 filed September 12, 1961, now abandoned.

The present invention relates to the preparation of tetrafluoroethylene, and, more particularly, to a process for the preparation of tetrafluoroethylene which employs substantially only methane, oxygen and hydrogen fluoride and produces essentially no unfluorinated side products.

Tetrafluoroethylene is an unsaturated fluorocarbon compound which is produced commercially on a large scale and is principally used as a monomer in the formation of fluorocarbon polymers, such as polytetrafluoroethylene, a plastic well known for its chemical stability and high temperature properties. Many methods have been described in the literature for the preparation of tetrafluoroethylene, all of which in some way involve a pyrolysis as a result of which the tetrafluoroethylene is formed. The nature of the common reactions by which the tetrafluoroethylene is formed, however, is such that a substantial number of unfluorinated by-products are formed. These by-products generally add to the cost of the preparation of tetrafluoroethylene, since these by-products cannot be sold economically, or, if sold, do not result in a financial return which approaches the cost of making them in the tetrafluoroethylene process, since generally these by-products are made more economically by different methods.

It is, therefore, an object of the present invention to provide an improved process for the manufacture of tetrafluoroethylene. It is another object of the present invention to provide a process for the preparation of tetrafluoroethylene which does not result in any significant unfluorinated by-product formation. Still a further object of the present invention is to provide a process for the preparation of tetrafluoroethylene using low cost starting materials, namely methane, oxygen and hydrogen fluoride. Other objects will become apparent hereinafter.

The objects of the present invention are accomplished by a process which comprises reacting a mixture of methane and recycled bromomethane and dibromomethane with bromine at a temperature of 300 to 700° C. in a pyrolysis furnace, separating the resulting hydrogen bromide, carbon tetrabromide, bromoform, dibromomethane and bromomethane, recycling the dibromomethane and bromomethane and reacting the bromoform with hydrogen fluoride at a temperature of 100 to 500° C., in the presence of a fluorination catalyst, preferably selected from the group consisting of chromium III oxide and titanium tetrafluoride, separating the resulting hydrogen bromide and bromodifluoromethane, pyrolyzing the bromodifluoromethane at a temperature of 400 to 1000° C., separating the resulting tetrafluoroethylene and hydrogen bromide, recycling unconverted bromodifluoromethane, oxidizing hydrogen bromide and carbon tetrabromide formed in the foregoing steps with molecular oxygen to bromine at a temperature of 300 to 500° C. and separating and recycling the resulting bromine.

The process of the present invention is based on the discovery that brominated by-products formed in the various reactions involved in the process can either be recycled or can be decomposed to result in the recovery of bromine to such a degree that substantially no bromine i.e., less than 3% is lost in the process. Hence, the process requires only the use of methane, oxygen and hydrogen fluoride and produces substantially no products other than tetrafluoroethylene. The process of the present invention differs significantly from a process based on an analogous system using, instead of bromine, chlorine. In such a process carbon tetrachloride is formed as a by-product which makes the complete recovery of the chlorine for purposes of recycle difficult if not impossible because of the difficulties encountered in the oxidation of carbon tetrachloride to chlorine which only gives rise to low yields of chlorine. The major reactions involved in the process of the present invention are illustrated by the following equations.

(1) $2CH_4 + 6Br_2 \rightarrow 2CHBr_3 + 6HBr$
(2) $2CHBr_3 + 4HF \rightarrow 2CHBrF_2 + 4HBr$
(3) $2CHBrF_2 \rightarrow C_2F_4 + 2HBr$
(4) $12HBr + 3O_2 \rightarrow 6Br_2 + 6H_2O$

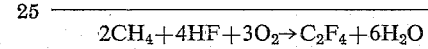

The bromination of methane to result in bromoform may also be combined with the oxidation of hydrogen bromide to bromine and water in a single reaction vessel if this is desirable. The reaction for combined process steps (1) and (4) would then be as follows:

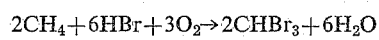

The process of the present invention is further illustrated by the attached drawing which shows in schematic form a flow sheet of the process discovered. In this flow sheet the bromination of methane and the oxidation of hydrogen bromide are treated as separate process steps. The various modifications necessary to combine these two process steps will be apparent to one skilled in the art.

Referring to the drawing, methane, bromine and recycled methane, bromomethane and dibromomethane are charged to the reactor 1. The reactor is preferably a nickel tube furnace containing an inert heat transfer solid such as silicon carbide, which is maintained at a temperature of 300 to 700° C., and, preferably at a temperature of 450 to 500° C. The pressure in the reactor is not critical and is selected to be of most convenience in the overall process. In general, the pressure varies from ½ to 6 atmospheres. A typical bromination reaction is shown in the following examples.

*Example I*

A 1 x 30″ nickel pipe packed with silicon carbide pellets was heated by a split tube furnace to a temperature of 450 to 500° C. In the period of one hour, 1.089 g./moles of methane and 2.38 g./moles of bromine were passed through the reactor. The pressure was maintained essentially at atmospheric pressure. The product collected during this period consisted of 0.0717 g./moles of methyl bromide, 0.1472 g./moles of methylene bromide, 0.504 g./moles of bromoform, 0.0452 g./moles of carbon tetrabromide, 1.771 g./moles of hydrogen bromide, and 0.643 g./moles of methane.

Example II

Using the apparatus and temperature and pressure conditions described in Example I, dibromomethane and bromine were fed at a mole ratio of 1.07 to the reactor for a contact time of 5.9 seconds. The resulting product distribution was 22.3 mol percent dibromomethane, 72.7 mol percent bromoform, and 4.7 mol percent carbon tetrabromide. No bromomethane was isolated.

Example III

Using the equipment described in Example I at the pressures and temperatures disclosed, 0.643 mole per hour of methane, 0.214 mole per hour of bromomethane, 0.232 mole per hour of dibromomethane, and 2.84 moles per hour of bromine were fed into the reactor for a contact time of one second. There was obtained 0.0204 mole per hour of bromomethane, 0.0942 mole per hour of dibromomethane, 0.6372 mole per hour of bromoform, 0.1206 mole per hour of carbon tetrabromide, 1.890 moles per hour of hydrogen bromide, 1.15 moles per hour of bromine and 0.232 mole per hour of methane.

The foregoing examples demonstrate the reaction in the bromination reactor. It is, in general, preferred to maintain an excess ratio of methane to bromine in the system, preferably from 5:1 to 1:1. Using an excess of methane results in two advantages, a low concentration of carbon tetrabromide in the product and also a complete conversion of bromine to brominated reaction products.

The product from the bromination reactor 1 comprising essentially methane, brominated methanes and hydrogen bromide are passed into a multistage hydrogen bromide absorber 2 in which the product is contacted with an azeotrope solution of hydrogen bromide in water. The absorption is carried out at temperatures of 20 to 60° C. and slightly positive pressure. Sufficient stages are provided in the absorber to result in the complete absorption of the hydrogen bromide in the product from the bromination reactor 1. The dilute or azeotropic hydrogen bromide solution is obtained from the hydrogen bromide stripper 15 to which the resulting concentrated hydrogen bromide solution obtained from the hydrogen bromide absorber 2 is recycled. The remaining non-absorbed gases are passed into a partial condenser 3. The lower boiling gases, methane and bromomethane, are recycled to the bromination unit 1, or, if it is desirable, can be further separated into methane and bromomethane by passing it through an oil scrubber which absorbs the bromomethane. The separation of methane from bromomethane is not shown in the attached drawing since it is achieved by a standard procedure and is not essential to the process of the present invention. The higher boiling components, dibromomethane, bromoform and carbon tetrabromide, are charged to distillation column 4 in which dibromomethane is removed from the product stream and recycled to the bromination unit. The distillation is carried out a atmospheric pressure. The remaining product stream, bromform and carbon tetrabromide, is charged to the reduced pressure distillation column 5 in which carbon tetrabromide is separated from the lower boiling bromoform. It is necessary to operate this column at reduced pressures in order to avoid the decomposition of carbon tetrabromide. The isolated carbon tetrabromide is fed to the oxidizer 16.

The bromoform obtained from the distillation column 5 is then combined with hydrogen fluoride and fluorinated in the reactor 6. The fluorination reactor is maintained at a temperature of 100 to 500° C., and the reaction is generally carried out in the presence of a catalyst, preferably a solid catalyst comprising an activated, anhydrous chromium (III) oxide which may be employed as such or distributed on an inert carrier such as alumina. The chromium (III) oxide catalyst is obtained by heating $Cr_2O_3$ in an inert atmosphere at a temperature of about 400 to about 600° C. Various methods of preparing this catalyst have been described in the literature. Although the preferred catalyst is the described chromium (III) oxide catalyst, other well known fluorination catalysts, such as titanium tetrafluoride, antimony fluorides and chromium fluoride, may be used. Using the chromium (III) oxide catalyst the molar ratio of the anhydrous hydrogen fluoride to the bromoform charged to the reactor may be varied over the range of 1 to 10 moles of hydrogen fluoride for each mole of the bromoform, the preferred ratio being determined by the amount of fluorination desired. Usually an amount of hydrogen fluoride is used that is at least the stoichiometric amount needed for the fluorination of the bromoform to difluorobromomethane, and, preferably, about a 50 molar percent excess. The process is simple and easily carried out by passing the gaseous mixture over or through the catalyst maintained at the desired temperature in a conventional reactor of the type commonly employed for a reaction of this character. Usually the gaseous mixture will be passed through a bed of the catalyst in a reaction tube. The reaction tube may be constructed of any metal or any other material that is inert to anyhdrous hydrogen fluoride, and is resistant to the temperature employed for extended periods of time. Suitable materials for construction of the reaction tube include Hastelloy C nickel alloy, Inconel nickel alloy, nickel, stainless steel, platinum and fused refractory alumina, such as alundum. The fluorination reaction is further illustrated by the following examples.

Example IV

Into a nickel tube, 28" x 1" heated to a temperature of 250° C. by a salt bath, was charged hydrogen fluoride and bromoform in a molar ratio of 2.45 for a contact time of 1.25 seconds. The upper 5 inches of the reactor were packed with stainless steel column packing to effect vaporization of the feed stream. A 5 inch section under the vaporization section was filled with chromium (III) oxide prepared from Guignet's Green which was dehydrated and activated under nitrogen at a temperature of 500° C. The conversion of bromoform was 51%. The products consisting essentially of fluorform and difluorobromomethane were obtained in a ratio of about 1:1.

The product mixture obtained from the fluorination reactor 6 is charged to the distillation column 7 in which the lower boiling hydrogen bromide and fluoroform are separated from the higher boiling hydrogen fluoride and bromodifluoromethane. The hydrogen bromide and the fluoroform are charged to the hydrogen bromide absorber 8 in which the fluoroform is separated from the hydrogen bromide. The hydrogen bromide is separated by the method employed in the hydrogen bromide absorber 2 above-described. The fluoroform formed constitutes a by-product of the process. The mixture of hydrogen fluoride and bromodifluroromethane obtained from distillation column 7 is charged to the hydrogen fluoride separator 9. This separator is preferably an activated carbon bed operated at adsorption temperatures of 30 to 50° C. and desorption temperatures of 250 to 300° C. at atmospheric pressure, although this is not critical. Under these conditions hydrogen fluoride is adsorbed by the carbon while bromodifluoromethane passes through the bed. On heating to a temperature of 250 to 300° C. the hydrogen fluoride is desorbed from the carbon and is recycled to the fluorination reactor 6. It is also feasible to carry out this separation by distillation.

The bromodifluoromethane is then charged to the pyrolysis unit 10, in which the bromodifluoromethane is pyrolyzed at temperatures of 400 to 1000° C. to tetrafluoroethylene. The pyrolysis unit in general comprises a tubular reactor constructed of materials inert to hydrogen bromide and capable of withstanding the temperatures involved in the process such as platinum lined Inconel tubes. The pyrolysis of bromodifluoromethane is further illustrated by the following example.

Example V

Bromodifluoromethane at essentially atmospheric pressure was fed to a 4′ by 14″ I.D. platinum lined Inconel tube at a rate such as to maintain a residence time of 0.1 to 0.5 second. The tube was heated to a temperature of 700 to 750° C. by an electric split-tube furnace. The composition of the pyrolysate was:

| Component: | Weight percent |
|---|---|
| Tetrafluoroethylene | 10.4 |
| Fluoroform | .04 |
| Hexafluoropropylene | .04 |
| Octafluorocyclobutane | .06 |
| Difluoromethane | .25 |
| Bromopentafluoroethane | .06 |
| Trifluoroethylene | .016 |
| Tetrafluoroethane | .025 |
| Hexafluoropropane | .09 |
| Bromodifluoromethane | 70.0 |
| Bromotetrafluoroethane | .21 |
| Dibromodifluoromethane | .41 |
| Bromohexafluoropropane | .35 |
| Dibromotetrafluoroethane | .11 |
| Hydrogen bromide | 17.9 |

As can be seen from this example, tetrafluoroethylene, hydrogen bromide and bromodifluoromethane constitute over 98% of the pyrolysate.

The pyrolysate is cooled and compressed and distilled in column 11. The column is generally operated at 165 p.s.i.g. pressure using a head temperature of −15° C. and a boiler temperature of 60° C. Hydrogen bromide, tetrafluoroethylene and the lower boiling fluorocarbons such as fluoroform and difluoromethane, are distilled over while the higher boiling fraction comprising bromodifluoromethane and the fluorocarbons boiling above tetrafluoroethylene are recovered from the bottom of the column. The bromodifluoromethane is then separated from the high boiling fluorocarbons in distillation column 12 and recycled to the pyrolysis unit. The low boiling fluorocarbons, i.e., boiling below tetrafluoroethylene, tetrafluoroethylene and hydrogen bromide, are charged to the hydrogen bromide absorber 13 in which the product stream is contacted with dilute hydrogen bromide to absorb the hydrogen bromide in the product stream. The construction of this unit and its operation are the same as that of the hydrogen bromide absorber 2 described above. The off gases from the hydrogen bromide absorber consist essentially of tetrafluoroethylene with small quantities of other fluorocarbons which may, if desirable, be separated from the tetrafluoroethylene by distillation techniques described in the literature.

The concentrated hydrogen bromide solution is charged to the hydrogen bromide stripper 14 in which anhydrous hydrogen bromide is removed overhead leaving an azeotrope of water and hydrogen bromide in the still which is recycled to the absorber 13 as the absorbing liquid. Similarly, the concentrated solutions of hydrogen bromide obtained in absorber 2 and absorber 8 are fed to the hydrogen bromide stripper 15 to result in anhydrous hydrogen bromide and a dilute azeotropic solution of hydrogen bromide which is recycled to the absorbers.

Anhydrous hydrogen bromide obtained from the two hydrogen bromide strippers together with any carbon tetrabromide formed in the process is charged to the oxidation unit 16.

The oxidation of hydrogen bromide with or without carbon tetrabromide is carried out at temperatures of 300 to 600° C. and, preferably, at temperatures of 450 to 500° C. in a tubular reactor. Although it is not necessary that a catalyst be employed, improved yields are obtained if a copper salt is employed as a catalyst. The copper salt is preferably distributed on an inert support which can act as a heat transfer material. It is preferred to oxidize the hydrogen bromide with a dilute mixture of molecular oxygen in an inert gas such as nitrogen. Air can be used as the oxidizing mixture. The following examples further illustrate the oxidation of hydrogen bromide and carbon tetrabromide to bromine.

Example VI

Into a 30″ x 1″ nickel tube containing a catalyst and/or support as shown in the table below was charged oxygen, nitrogen and hydrogen bromide in a 1:1:1 ratio for a contact time of approximately 1.5 seconds. The reactor was maintained at atmospheric pressure and heated to a temperature of 450° C. by a split tube furnace. The conversion to bromine in mol percent is shown in the following table.

| Catalyst | Support | Conversion, percent |
|---|---|---|
| CuO | Silicon Carbide | 91.2 |
| | do | 97.6 |
| $Cu_2Br_2$ x 3NaBr | do | 98.8 |
| $CuCrO_4$ | | 96.0 |

Where the catalyst was employed on the support the concentration of the catalyst as 3%.

Example VII

Into a 1″ x 12″ quartz tube was charged 0.0603 mole of carbon tetrabromide and 5000 ml. of a 1:1 mixture of oxygen and nitrogen. The reactor contained 110 cc. of 3% cupric oxide on silicon carbide packing and was maintained at a temperature of 430° C. The contact time of the reaction mixture in the reactor was less than 3 seconds. The resulting product showed a 92% bromine recovery, the remainder being unconverted carbon tetrabromide.

The hydrogen bromide oxidation product comprising hydrogen bromide, water, bromine and inert gases is charged to a cooler 17 in which substantially all of the bromine and dilute hydrogen bromide is separated from the inert gases. If it is desirable to recover the bromine remaining with the inert gases, this can be accomplished by passing the mixture of inert gases and bromine traces from cooler 17 to another absorber containing aqueous potassium bromide which absorbs the bromine from the inert gases. On heating of the aqueous potassium bromide, bromine and water is recovered and recycled to cooler 17. The mixture of bromine and dilute hydrogen bromide from cooler 17 is charged to a decanter 18 in which bromine is recovered from the lower liquid phase and a dilute aqueous solution of hydrogen bromide is recovered from the upper liquid phase. The dilute hydrogen bromide is recycled into the system. The bromine recovered is then recycled to the bromination unit 1.

The oxidation of hydrogen bromide to bromine and the bromination of methane may, as indicated above, be combined into a single step. This reaction is shown by the following example.

Example VIII

A reactor comprising a 1″ x 30″ nickel tube is filled with 200 cc. of silicon carbide pellets having thereon distributed 3% of $Cu_2Br_2$ x 2KBr. The reactor was maintained at a temperature of 450° C. and 0.502 mole per hour of methane, 0.868 mole per hour of hydrogen bromide, 0.561 mole per hour of oxygen and 0.580 mole per hour of nitrogen were charged to the reactor for a contact time of 5.2 seconds. The resulting product distribution was 15.8 mol percent of bromomethane, 12.8 mol percent of dibromomethane, 62.7 mol percent of bromoform and 8.7 mol percent of carbon tetrabromide. The conversion of hydrogen bromide to bromomethanes was 85%.

The foregoing description has shown in detail the process of the present invention and has exemplified the various chemical reactions involved in the process. It will be apparent that many modifications can be made from the specific descriptions of the process given without varying from the scope of the invention.

The particular advantage of the process of the present invention resides in its ability to recover and recycle substantially all of the bromine used in the formation of intermediates in the process of preparing tetrafluoroethylene from methane, hydrogen fluoride and oxygen. It is to be realized, however, that some mechanical losses of bromine can occur and to this extent it would be necessary to replace the bromine.

I claim:

1. A process for the preparation of tetrafluoroethylene from methane, hydrogen fluoride and oxygen which comprises the steps of reacting a mixture of methane and recycled bromomethane and dibromomethane with bromine at a temperature of 300 to 700° C. in a pyrolysis furnace, separating the resulting hydrogen bromide, carbon tetrabromide, bromoform, dibromomethane and bromomethane, reacting bromoform with hydrogen fluoride at a temperature of 100 to 500° C. in the presence of a fluorination catalyst, separating the resulting hydrogen bromide and bromodifluoromethane, pyrolyzing the bromodifluoromethane at a temperature of 400 to 1000° C., separating the resulting tetrafluoroethylene and hydrogen bromide, recycling unconverted bromodifluoromethane to the preceding pyrolyzing step, oxidizing the hydrogen bromide and carbon tetrabromide formed in the foregoing steps to bromine by contacting said hydrogen bromide and carbon tetrabromide with oxygen at a temperature of 300 to 500° C. and separating and recycling the resulting bromine.

2. The process of claim 1 wherein the bromination of methane is combined with the oxidation of hydrogen bromide in a single reaction vessel.

3. A process for the preparation of tetrafluoroethylene from methane, hydrogen fluoride and oxygen which comprises the steps of reacting a mixture of methane and recycled bromomethane and dibromomethane with bromine at a temperature of 300 to 700° C. in a pyrolysis furnace, separating the resulting hydrogen bromide, carbon tetrabromide, bromoform, dibromomethane and bromomethane, recycling the bromomethane and dibromomethane, reacting the bromoform with hydrogen fluoride at a temperature of 100 to 500° C. in the presence of a chromium (III) oxide catalyst, separating the resulting hydrogen bromide and bromodifluoromethane, pyrolyzing the bromodifluoromethane at a temperature of 400 to 1000° C., separating the resulting tetrafluoroethylene and hydrogen bromide, recycling unconverted bromodifluoromethane to the preceding pyrolyzing step, oxidizing the hydrogen bromide and carbon tetrabromide formed in the foregoing steps to bromine by contacting said hydrogen bromide and carbon tetrabromide with oxygen at a temperature of 300 to 500° C. in the presence of a cupric salt catalyst and separating and recycling the resulting bromine.

References Cited by the Examiner

UNITED STATES PATENTS 3,096,379  7/63  Blair _____ 260—653.3

FOREIGN PATENTS 911,215  11/62  Great Britain.

LEON ZITVER, *Primary Examiner.*

DANIEL D. HORWITZ, *Examiner.*